(12) United States Patent
Sappinen

(10) Patent No.: US 8,751,540 B2
(45) Date of Patent: Jun. 10, 2014

(54) DYNAMIC ASSESSMENT SYSTEM

(76) Inventor: Jukka Sappinen, Espoo (FI)

( * ) Notice: Subject to any disclaimer, the term of this patent is extended or adjusted under 35 U.S.C. 154(b) by 144 days.

(21) Appl. No.: 13/205,402

(22) Filed: Aug. 8, 2011

(65) Prior Publication Data

US 2013/0041923 A1  Feb. 14, 2013

(51) Int. Cl.
*G06F 17/30* (2006.01)

(52) U.S. Cl.
USPC ........................................................ 707/792

(58) Field of Classification Search
USPC ........................................................ 707/792
See application file for complete search history.

(56) References Cited

U.S. PATENT DOCUMENTS

| 2005/0138031 | A1* | 6/2005 | Wefers ............................... 707/9 |
| 2005/0234755 | A1* | 10/2005 | Baggett et al. ..................... 705/7 |
| 2011/0145284 | A1* | 6/2011 | Fliess et al. .................... 707/770 |
| 2011/0178940 | A1* | 7/2011 | Kelly et al. .................... 705/321 |
| 2012/0078669 | A1* | 3/2012 | Harkins et al. ............... 705/7.11 |

\* cited by examiner

*Primary Examiner* — Cindy Nguyen
(74) *Attorney, Agent, or Firm* — Ziegler IP Law Group, LLC

(57) ABSTRACT

A method includes storing a plurality of users, assigned with at least one nonhierarchical dependency, for defining a dynamic organization structure; storing assessment data objects, each having dependencies, for defining a dynamic assessment data object structure; and determining an assessment need in the dynamic organization structure. The method further includes defining a dynamic assessment account, in response to the assessment need, associating an administrator user, a response user and assessment data; defining needed assessment data objects for the assessment data, associated with at least one response user; and determining available information relating to the needed assessment data objects from a dynamic database. The method further includes providing a request relating to the needed assessment data objects to at least one response user; receiving a response relating to the request for the needed assessment data objects, from the at least one response user; and updating assessment data objects of the dynamic assessment data object structure based on the received response and the dependencies.

24 Claims, 10 Drawing Sheets

| UserID | Pwd | Owners | RightsU | | | RightsO | | |
|---|---|---|---|---|---|---|---|---|
| | | | A | B | C | W | Y | Z |
| User A | *** | SA | x | | x | x | | x |
| User B | *** | A, D | | x | x | | x | x |
| User C | *** | A | x | x | x | x | x | |

Fig. 10                                    1000

DYNAMIC ASSESSMENT SYSTEM

TECHNICAL FIELD

The present disclosure generally relates to dynamic assessment system. The present disclosure relates more particularly, though not exclusively, to defining the assessment and managing the results database.

Technology has been developed to help in providing decision makers with information relating to human behavior, values, attitudes, motivators and other areas influencing human personality and behavior. Typical users of such information would be anyone needing to understand any aspect of human personality or factors influencing it in order to better understand the behavior of the individual, whether the individual is the person him/herself or any other person.

Information is usually collected by asking the person him/herself to complete a questionnaire (often called self-assessment questionnaire) or asking other people to complete it assessing this person (often called 360 assessment questionnaire). Also other methods for collecting the data exist. The questionnaire can be in paper format, shown on stand-alone or network computer or presented via internet.

Typically, the answers are processed via software using specifically designed algorithms that process the original answers to format more usable for the receiver of the information. The outcome of the process (often called assessment report) can be processed manually, by the computer or by a central server connected to the internet browser. The results can be processed immediately, after all respondents have completed their questionnaires, at a pre-defined time or at any time defined by a user who has usage rights to decide and administer this process. The results can be processed of one person and/or several persons in the same report. The results can be shown on the computer screen or inter browser or they can be emailed as an attachment or download link to the respondent and/or any other person. The process of showing and sending the results can be automated or conducted manually at any time.

The typical areas of application for this information vary, but may contain at least one of the following: recruitment, career planning, training need analysis, skills development, market research, organizational climate survey, customer satisfaction survey, receiving/providing feedback, coaching, marital counseling and interpersonal skills training. In business organizations, the users of the information are typically human resources, management at different levels, training department, external consultants, teams and the individuals.

BACKGROUND ART

A variety of assessments provided for client organization processes is increasing. At the same time the utilization of the assessment reports become more difficult.

The assessment report content is often being designed by the provider of the report whereas the user of the report may not have possibilities to influence the content of the report. The assessment report carries the outlook (and the brand) of the provider of the report, and the user may not be able to combine results of all assessments they have processed in the past in a flexible way. Each assessment project may be required to be dealt as an independent process.

The content of the report is typically designed by the external provider of the assessment and the user needs to take the report as such. Some assessment instruments provide possibilities to influence the content of the report to some extent, like changing the page order or selecting from pre-defined entities which will be included in the report. However, it is not possible to create new elements to the report and design the content of the report from the very beginning. Current tools, system, interfaces and methods provide only limited capabilities for users to easily access the assessment data and manage the data in a timely manner (for example what they want, where they want, when they want, how they want, why they want, who they want).

Currently popular methods for selecting an assessment provider is based on a user trying to find an assessment report provider whose assessment report matches best to an intended application of the user. The user may search among the available report providers for the available report best matching with their needs. Furthermore, the user may design a questionnaire and link the report between the process and other material. The user may create material that helps navigating between the report and the application process. This requires extra work and never results in perfect integration. The report carries the brand and style of the report provider, leaving it as external material to the other material used. User can also reproduce the information but needs to produce additional charts (for example by using an external chart tool) to compare the results of different assessment projects.

Another drawback of current systems is their design being process-based. Someone completes a questionnaire, the system produces results and forwards the results to a recipient. Such approach reduces the possibilities for the user to use the information for other applications than the original one. The user would benefit from a system enabling not only reproducing the results, but also reproducing the results in different formats, combined with results of other persons. It would also be important if the system was able to monitor the system database and actively inform the user of information useful for the application of interest (to the user) and information about to become outdated.

The aspects of the disclosed embodiments address drawbacks of existing solutions and technologies, to provide new, enhanced solutions and techniques and/or to provide new technical alternatives.

SUMMARY

According to a first aspect of the disclosed embodiments there is provided a method comprising:
storing a plurality of users, assigned with at least one nonhierarchical dependency, for defining a dynamic organization structure;
storing assessment data objects, each having dependencies, for defining a dynamic assessment data object structure;
determining an assessment need in the dynamic organization structure; defining a dynamic assessment account, in response to the assessment need, associating an administrator user, a response user and assessment data;
defining needed assessment data objects for the assessment data, associated with at least one response user;
determining available information relating to the needed assessment data objects from a dynamic database;
providing a request relating to the needed assessment data objects to at least one response user;
receiving a response relating to the request for the needed assessment data objects, from the at least one response user; and
updating assessment data objects of the dynamic assessment data object structure based on the received response and the dependencies.

According to a second aspect of the disclosed embodiments there is provided a method comprising:
- providing a plurality of users, assigned with at least one nonhierarchical dependency, for defining a dynamic organization structure;
- providing assessment data objects, each having dependencies, for defining a dynamic assessment data object structure;
- determining an assessment need in the dynamic organization structure; defining assessment data objects relating to the assessment need for the assessment data, associated with at least one response user;
- determining formats of an assessment report for assessment data objects, each having dependencies;
- displaying at least one format and at least one assessment data object for at least one user;
- selecting at least one format and at least one assessment data object; and
- generating the assessment report using the assessment data objects of the dynamic database.

In certain example embodiments of the disclosure, there is provided a method, wherein the profile information comprises at least one of the following:
- user identification;
- a password;
- an owner;
- access right to user; and
- access right to assessment data object.

In certain example embodiments of the disclosure, there is provided a method, further comprising:
- selecting additional assessment information from the dynamic database; and
- using the additional assessment information in generating the assessment report.

The additional assessment information may comprise at least one of the following: benchmark information, user profile information, design information, contact information and time information. The dynamic database comprises a global database and a personal database. The global database may be accessible to registered users of the dynamic database. The personal database may be accessible to users having access rights based on the nonhierarchical dependencies.

In certain example embodiments of the disclosure, there is provided a method, further comprising:
- maintaining an association between user identification and a user password;
- receiving the user identification and the user password from the user when the user is accessing the dynamic database; and
- allowing access to the dynamic database based on the received user identification and the user password.

The generation of the assessment data objects may comprise selecting at least one assessment data object from the dynamic database. The generation of the assessment data objects may comprise creating at least one new assessment data object to the dynamic database.

In certain example embodiments of the disclosure, there is provided a method, wherein the assessment data object comprises at least one of the following:
- an assessment questionnaire;
- a response to an assessment questionnaire;
- a benchmark;
- a competence;
- a test;
- a job template; and
- a job template score.

The format may comprise at least one of the following:
- a design for collecting assessment data; and
- a design for reporting assessment data.

The determination of the assessment report format may comprise selecting at least one assessment report format from the dynamic database. The determination of the assessment report format may also comprise creating at least one assessment report format to the dynamic database. Access rights may be defined to the assessment data objects of the dynamic database for the user. The access rights to the dynamic database may comprise at least one of the following: a system administrator, a user administrator, a result user and a response user.

A first assessment data object and a second assessment data object may be selected from the dynamic database, and the second assessment data object may be selected based on the selection of the first assessment data object.

In an embodiment, assessment data object is selected from the dynamic database based on the dynamic profile information of the associated user. The assessment report format may be determined based on the dynamic profile information of the associated user.

According to a second aspect of the disclosed embodiments there is provided a device comprising:
- a communication unit configured to provide access to a dynamic database;
- a processor;
- a memory including computer program code;
- the memory and the computer program code configured to, with the processor, cause the device to:
  - provide assessment data objects, associated with at least one user; receive available information relating to assessment data objects from a dynamic database;
  - transmit a request for unavailable assessment data objects for at least one response user;
  - receive the unavailable information to the assessment data objects from the at least response user;
  - transmit updated dynamic database information based on the received unavailable information; and
  - determine an assessment report format for at least one user.

According to a third aspect of the disclosed embodiments there is provided an apparatus comprising:
- a communication unit configured to provide access to a device;
- a processor;
- a memory including computer program code;
- the memory and the computer program code configured to, with the processor, cause the apparatus to:
  - generate dynamic profile information for a user;
  - generate assessment data objects, associated with at least one user; determine available information relating to assessment data objects from a dynamic database;
  - provide a request for unavailable assessment data objects to at least one response user;
  - receive the unavailable information to the assessment data objects from the at least one response user;
  - update the dynamic database based on the received unavailable information;
  - determine an assessment report format for at least one user; and generate the assessment report using the assessment data objects from the dynamic database.

According to a fourth aspect of the disclosed embodiments there is provided a computer program comprising computer executable program code which, when executed by at least one processor of an apparatus, causes the apparatus to perform the steps of the first example aspect.

According to a fifth aspect of the disclosed embodiments there is provided a memory medium or computer readable medium carrying the computer program of the fourth example aspect.

Any foregoing memory medium may comprise a digital data storage such as a data disc or diskette, optical storage, magnetic storage, holographic storage, opto-magnetic storage, phase-change memory, resistive random access memory, magnetic random access memory, solid-electrolyte memory, ferroelectric random access memory, organic memory or polymer memory. The memory medium may be formed into a device without other substantial functions than storing memory or it may be formed as part of a device with other functions, including but not limited to a memory of a computer, a chip set, and a sub assembly of an electronic device.

Different non-binding example aspects and embodiments of the present disclosure have been illustrated in the foregoing. The above embodiments are used merely to explain selected aspects or steps that may be utilized in implementations of the aspects of the disclosed embodiments. Some embodiments may be presented only with reference to certain aspects of the present disclosure. It should be appreciated that corresponding embodiments may apply to other aspects as well.

BRIEF DESCRIPTION OF THE DRAWINGS

The aspects of the disclosed embodiments will be described, by way of example only, with reference to the accompanying drawings, in which:

FIG. 10 shows a schematic diagram of user profile information according to an example embodiment of the present disclosure;

DETAILED DESCRIPTION

In the following description, like numbers denote like elements. The systems and techniques described here relate to presenting predictive data objects based on contextual profile information.

According to an example embodiment of the invention, information relating to the intended application is integrated to the assessment report. For example, the assessment report is made as a work book in a training session by the system, instead of having a separate workbook that refers to different parts of the assessment report. In an embodiment, the assessment report is integrated in the company's interview process (when recruiting new people) in a way that it would actually work as walk-through manual for the interviewer. This would help tremendously especially less experienced interviewers who would have a ready designed interview manual that is tailored for this particular applicant.

Designing of the assessment reports may also have the same look as all their user materials carrying their own brand. Furthermore, users of the assessment tools may have more flexibility in comparing results against each other and against other instruments, against company/national/international norms and benchmarks. In an embodiment, a system of assessment tools provides the user with an online solution enabling on-screen interactive comparison of results against any set benchmark criteria. Such solutions change the assessment solutions from "assessment" to "management" system.

According to an example embodiment of the invention, a user may utilize available assessment instruments in different phases of an assessment process. First, an intended application is defined. The user would like to define clearly what is to be done, what is the goal and what are the needs from the assessment to achieve the goal.

Second, the user would like to define clearly how the assessment information is provided to the relevant parties, and in which format of information.

Third, a questionnaire design may be determined. Only the relevant questions should be included in the questionnaire for saving time and keeping the respondent's motivation and focus on the main topic.

Fourth, to achieve full integration, the user may wish to design the style and brand of the report. Target is that the report fits in to other assessment material used and also to a corporate brand.

Fifth, a fully integrated report may be taken into use. As a result of the preceding steps will it be possible to maximize the return on their investment to the assessment tools.

Sixth, an active data management system may be created. The users would like to have an easy-to-use management system for their assessment data that would be accessible at any time and enable different kinds of comparisons they would need to make.

Figure 1:
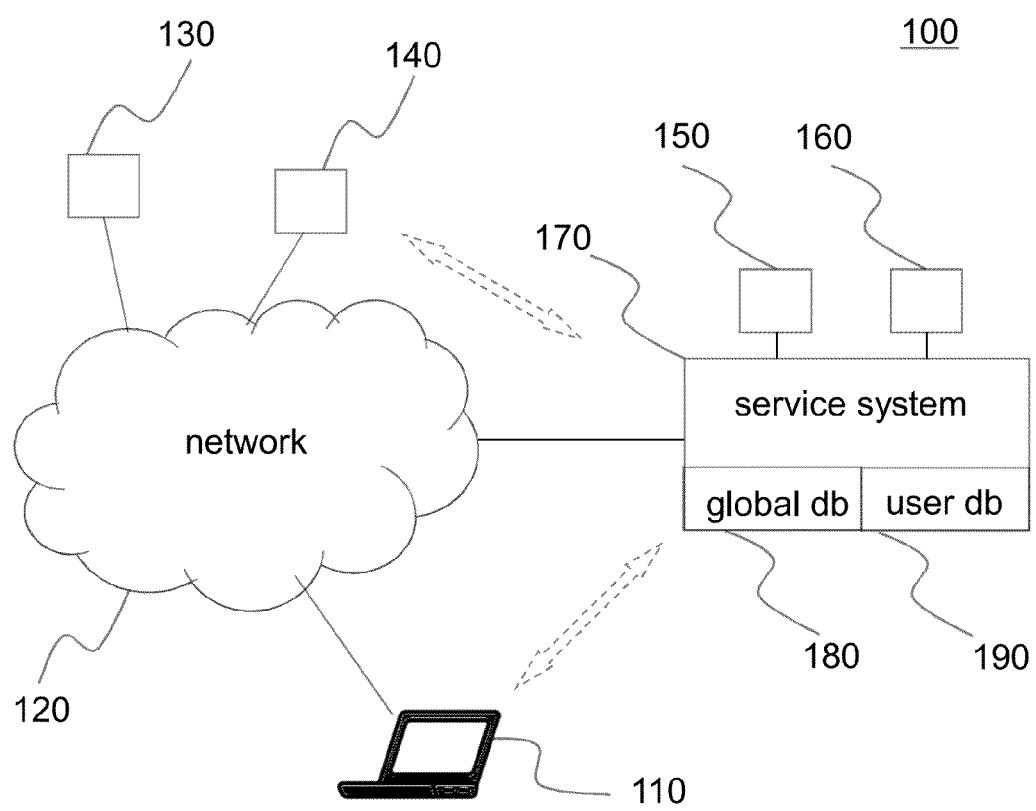
FIG. 1 shows a schematic picture of an assessment system having data flows between elements in a system according to an example embodiment of the present disclosure.

FIG. 1 shows a schematic picture of an assessment system having data flows between elements in a system according to an example embodiment of the present disclosure. The assessment system 100 provides assessment data flows between elements in the system 100. The system 100 includes an apparatus 110, shown as a portable computer for communicating with a user, but could take any appropriate form, such as a cellular telephone handset, personal digital assistant, a personal computer, or a voice-driven communication device. Apparatus 110 may obtain the information the user needs through network 120 that may be a single network or combination of networks. Apparatus 110 may also generate information. An assessment service system 170 may also communicate with the network 120 to receive assessment data object requests from apparatus 110 and locate information to return to the apparatus 110. The assessment service system 170 may be of any applicable form.

Among other components included in the assessment service system 170 there may be a global database 180, a user database 190, an index database 150 and a cached information database 160. The global database 180 contains assessment data that is available to all users of the assessment service system 100, for example public assessment questionnaires, public report formats, public responses to assessment questionnaires and benchmark information. The user database 190 contains assessment data that is available only to the dedicated user of the assessment service system 100, for example private assessment questionnaires, private report formats, private responses to assessment questionnaires, user profile information and private benchmark information. The index database 150 contains data that represent searchable information available to the assessment service system 170. For example, the assessment service system 170 may scan the internet, intranets or various databases for content such as web sites, service providers, external indexes or workgroup discussions, may extract key words and other objects from the content, and may organize the information in a manner that permits ready searching and retrieval. The index database 150 may also generate other information from the content, such as indicators of how certain web sites link to other web sites, and other related metadata. Assessment data may also be transferred between the databases 180, 190. For example, a user having clone rights may clone an item from the global database 180 to the user database 190.

In an example embodiment of the present disclosure, the cached information database 160 contains copies or substantial copies of content that the service system 170 locates. For example, the cached information database 160 may contain assessment questionnaires, report formats, benchmark information, user profiles, web pages or portions of web pages, for example only textual, only non-video content, only images or only specific metadata. In this manner, a user who accesses system 170 may request the cached information rather than making direct connection with the content provider, such as when the content provider is inaccessible, has changed the content since it was cached, or when the connection to the content provided is substantially slower than that to the assessment service system 170. Service system 170 may also be used to provide partial or subsets of information or combinations of information that may be preferable, in some cases, to full web content directly from source systems.

The assessment system 100 may also include other nodes 130, 140 connected to the network 120. These nodes 130, 140 could include any sort of device or devices capable of communicating with or over the network 120. For example, node 130 could be a user apparatus responding to the assessment questionnaire defined by the user of device 110. Node 530 may also be a web server that is capable of delivering content in response to requests by users, such as a user of device 110, or deliver content automatically based on a variety of attributes and variables. As another example, node 140 could be an external service provider that may be accessed by the device 110 or the assessment service system 170.

Dashed arrows in FIG. 1 show an exemplary flow of information relating to the provision of a response to a request from apparatus 110, 130, 140 along with the provision of assessment data object information to apparatus 110, 130, 140. Requests can be initiated by either apparatus 110 or by assessment service system 170. Although the request passes through network 120 (and other components that are not pictured), it is directed at service system 170. Service system 170 then receives the assessment request and applies it to an assessment process, such as by parsing the request, locating available content in databases 150, 160, 180, 190 that contains available responses for the request. The service system 170 may then transmit assessment requests to respondents 130, 140 relating to assessment questionnaire objects without available responses, receive responses from the respondents 130, 140, organize the assessment information to a report in the assessment service system 170, as defined by the requesting user 110, and transmit the report, or indication of it, to designated users 110 through network 120 as a service result. For example, the returned information may also be transcoded to appropriate format for processing in the apparatus 110, such as HTML code, XML messages, WAP code, java applets, JavaScript object notations (JSONs), xhtml, plain text, voiceXML, VoxML, VXML or such.

Figure 2:
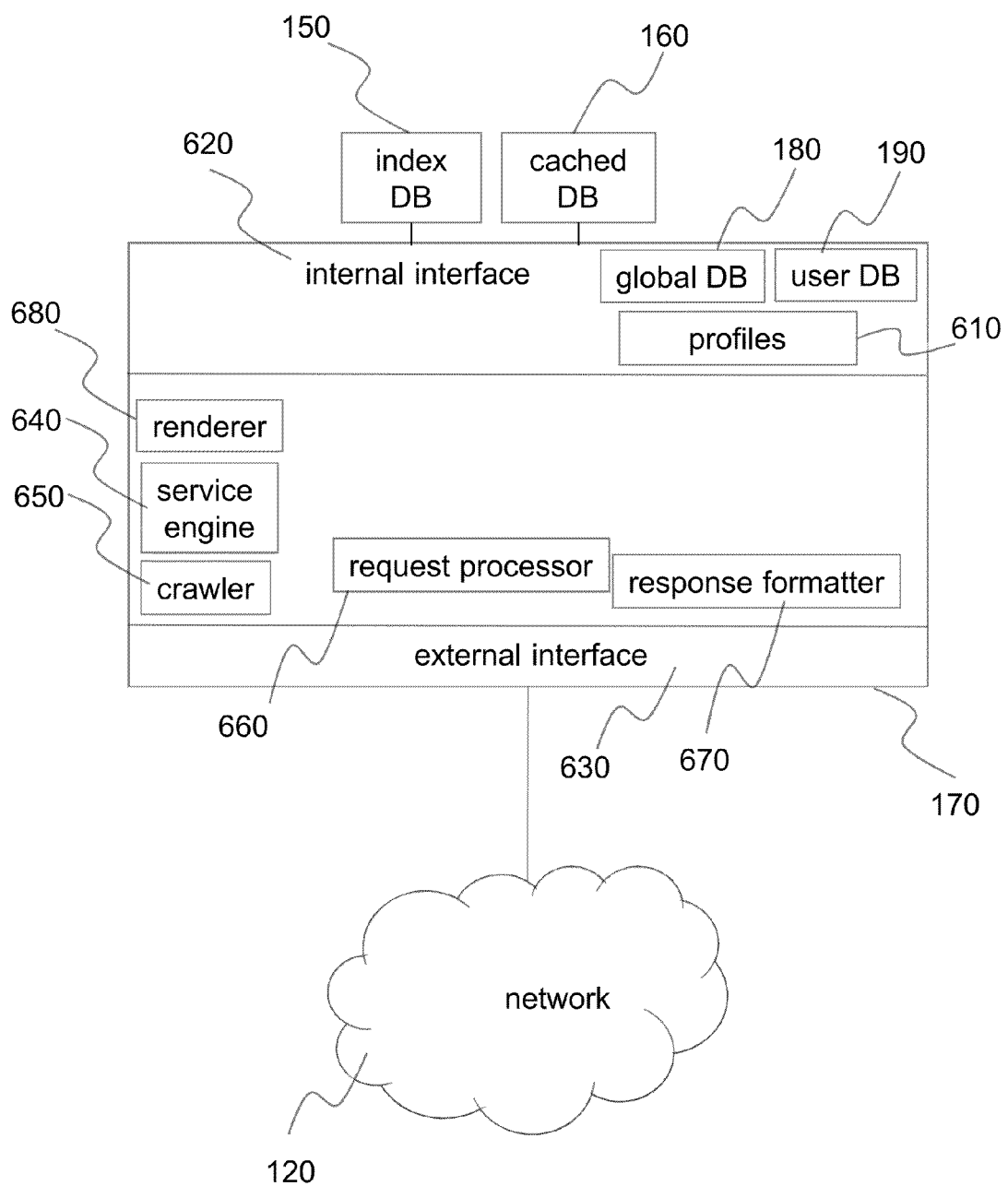
FIG. 2 shows a schematic diagram of an assessment service system providing assessment data objects according to an example embodiment of the present disclosure.

FIG. 2 shows a schematic diagram of an assessment service system 170 providing assessment data objects according to an example embodiment of the present disclosure. Service system 170 may receive and/or request for assessments, generate assessment questionnaire responses to the requests, and generate assessment questionnaire objects based on certain criteria, for example different profile information, algorithms and such. Service system 170 is connected to a network 120, such as the internet, to be able to communicate with users who may be interested in accessing the services provided by assessment service system 170. The assessment service system 170 may be broken into multiple separate systems to allow for scalability, and may be connected to network 120 in any of a variety of ways, as is commonly known.

The service system 170 may include a global database 180 and a user database 190. Furthermore the service system 170 may also include an index database 150 and a cached information database 160. These databases 150, 160, 180, 190 may be connected to service system 170, for example, by a high bandwidth LAN or WAN, or could also be connected to the search system 170 through network 120. The databases may also be located in the same location as the assessment system 170 or split up so that they are located in multiple locations.

Search system 170 may communicate through an internal interface 620 and an external interface 630, which are shown as distinct interfaces, but may be partially or fully combined, or may be represented by additional interfaces. For example, internal interface 620 may comprise interface devices for a high speed, high bandwidth network such as SONET, Infiniband, or Ethernet network cards, or any appropriate communication hardware operating under an appropriate protocol, so that assessment service system 170 can respond to a large number of distinct assessment requests simultaneously. External interface 630 may comprise interface devices for communicating with network 120, such as ethernet network interface cards (NICs) or other communications devices. The precise design of the service system 170 could take any appropriate form.

Within the service system 170, a service engine 640 operates to produce assessment service results in response to assessment service requests from users, employing information stored in databases 150, 160, 180, 190. The information in index database 150 may be gathered by a crawler 650, which may continuously or almost continuously obtain new information from sources connected to network 120. A renderer 680 may be included in the service system 170 for rendering data object related information according to system specific format. Rendering may be done also in the crawler 650, in the service engine 640 or in the external interface 630. Service requests, such as assessment questionnaires, may be received through the external interface 630 and handled by the request processor 660. For example, request processor 660 may parse the requests and reformat them, for example from html/text requests to internally usable search terms/strings. The assessment information generated by the service engine 640 in response to a request may also be converted by response formatter 670 in a manner that allows it to be used by the requesting device, such as in a WAP format, HTML document, XML document or VoiceML result, and then transmitted via external interface 630.

Assessment service information may be retrieved and/or generated by the service engine 640, which may monitor requests from a user, responses to the user or any number of requests and responses not exclusively related to a particular user. To clarify, these requests and responses may be generated by internal or external systems and services. In this manner, the service engine 640 is able to begin working as soon as a request is received or a response is delivered, either from a user of the system, or from other system components or external systems. For example, where an assessment questionnaire request is received by the service system 170, that request may be processed and forwarded to service engine 640. In addition, the service engine 640 may recognize the request, and cause additional formatted requests to be forwarded to the service engine. The service engine 640 may cause the assessment information that results from those requests to be transmitted to the user's apparatus or external services, for example, using response formatter 670.

The service engine 640 may include, for example, assessment rules, algorithms, data and assessment engine. The assessment rules may include parameters that may be selected and changed to manage the manner in which assessment information is gathered. The rules may be specific to particular users (e.g., in a profile of rules for the user, or with pointers for a user to particular parameters to minimize storage space required).

The assessment service system 170 may continually learn from users and it is possible to build a dedicated index, for example a content matching engine, based on the data passing through the system. Such index may be located in the index database 150. It is also possible to use any available public or proprietary index, for example but not limited to, an openly available index on the internet or a corporate database within a corporate intranet.

In one embodiment of the present disclosure the dynamic profile information may contain several types of attributes discussed earlier in this application. Profile information for the users may be located in system storage block 610 of FIG. 2. Profile information may also be located in the user database 190 or in the global database. Profiles 610 may also connect to other users and systems, including both internal and external users and systems. Profiles and filters may be adapted and applied to external systems, partially or wholly, and external profile information and/or filter information may be adapted and applied, either partially or wholly, to internal profiles and filters.

In an example embodiment of the present disclosure, the service system described in FIGS. 1 to 2 may be applied to various purposes, for example enterprise assessment data management, personal assessment data management and remote assessment.

In enterprise data management, the assessment service system may provide any assessment service based on company and/or employee needs, for example recruitment, training need analysis, skills development, market research, organizational climate survey, customer satisfaction survey, receiving/providing feedback, coaching and interpersonal skills training. User profile information may be applied to enterprise usage. There are vast amount of information contained in corporate intranets, corporate database systems and related systems. For example in customer relationship management tools, human resources tools, project management tools, requirements management tools, communications tools, recruitment tools, marketing tools, strategic planning tools, financial tool and additionally in relevant external data sources. However, this information is often under-utilized as companies, and their employees face difficulties in providing and/or discovering and/or sharing the most relevant and beneficial data objects in a timely manner. The ability to increase the efficiency and/or enjoyment of this represents a significant opportunity to increase productivity and competitiveness in enterprises.

In personal data management, the service system may provide assessment service based on personal information needs. Such assessment service may be for example, career planning, training need analysis, skills development, receiving/providing feedback, coaching, marital counselling and interpersonal skills training. User profile information may be applied to personal usage. Individuals increasingly create, store, manipulate, backup and share an increasing amount of data objects across a wide variety of services and apparatuses. These data objects represent a vast potential resource for individuals. However, these are often under-utilized as individuals face difficulties in providing and/or discovering and/or sharing the most relevant and beneficial data objects in a timely manner. The ability to increase the efficiency and/or enjoyment of this represents a significant opportunity to increase personal productivity and satisfaction of individuals.

Figure 3:
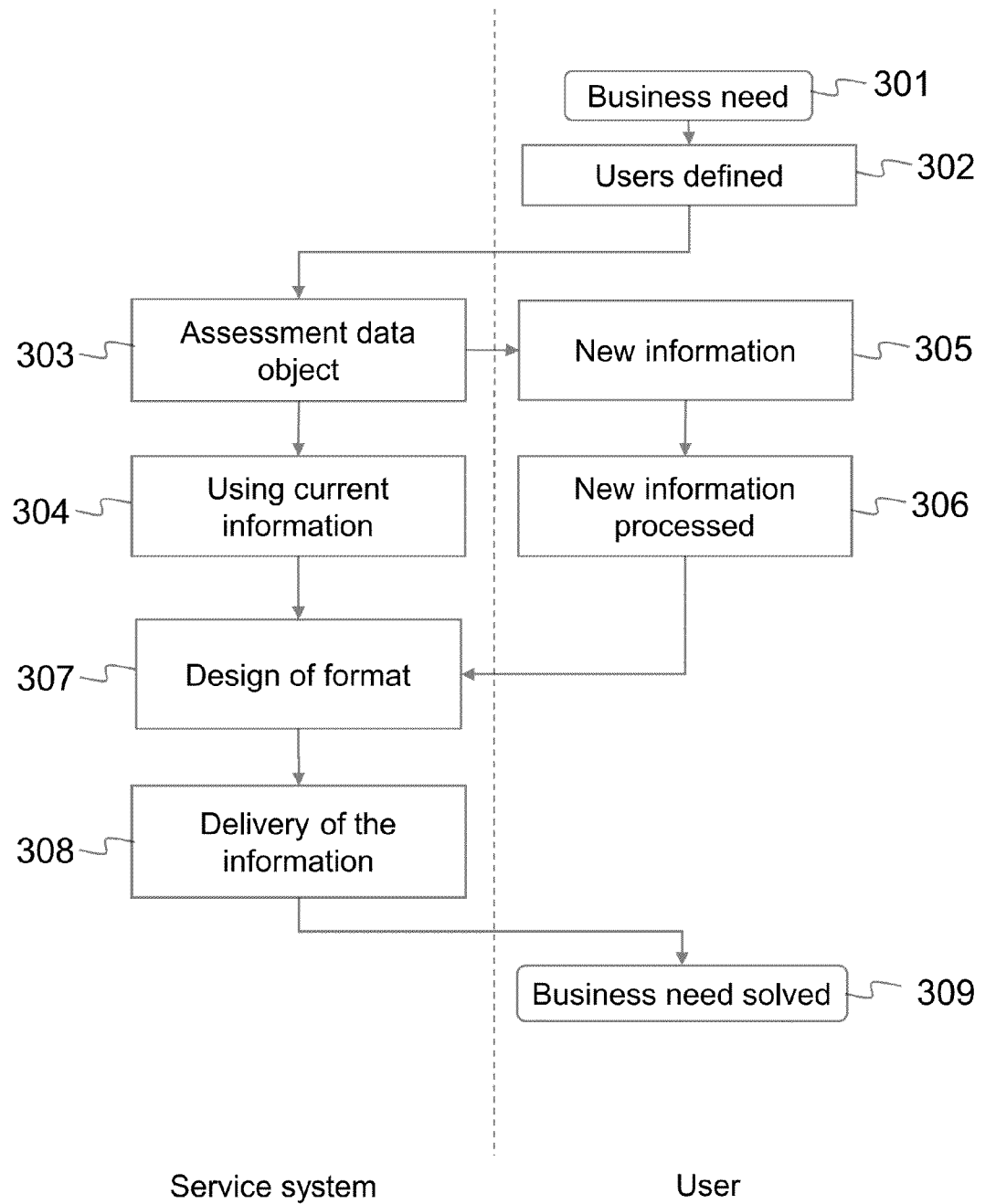
FIG. 3 shows a flow chart of exemplary steps for providing assessment service according to an example embodiment of the present disclosure.

FIG. 3 shows a flow chart of exemplary steps for providing assessment service according to an example embodiment of the present disclosure. The method steps may be performed in parallel and the operations may occur in other order. In addition, more steps or fewer steps may be carried out. The method begins at block 301 when a business need exist. Such beginning trigger may be a need relating to any organizational development need that requires understanding of the people involved. It may be (among other needs) a need for organizational restructuring, problem solving relating, organizational development, competences development, recruitment and career planning. In an embodiment, the system helps understanding what information is needed to solve the particular need, at the same time saving the organization costs from collecting the information. This can be achieved by maximizing the use of current information, minimizing the need for collecting new information and maximizing the use of global information available to the organization.

In block 302, the assessment service system is provided relevant users to help solving the business need. This means analysing the need and understanding the stake holders and their specific connection to the need.

People in the dynamic database can be structured similarly as their roles in the organization. New people and updated information will automatically update the organization structure of the dynamic organization in the assessment system. Different individuals or users in the organization may have access to their own part of the organization in the assessment system, and benchmark it against other parts of the organization, for example. The organization may be given parameters that the assessment system automatically monitors, produces reports, asks for more data if needed, sends summary reports and gives alarm messages if needed. In an embodiment, an organization thermometer may monitor the organization's well-being, for example.

After identifying the users involved, the next step is to identify the type of information each of them needs in block 303. The dynamic assessment database helps in identifying the need for each involved person. This is a global interactive database for different assessment data objects, such as data collection questionnaires. It is also possible for the user to define own assessment data objects, such as questionnaires, and allow other uses access to them.

Different users in the system may have different roles and rights. The roles and rights may be automatically updated based on the actions taken by other users and the data entered into the system. For example, if a manager's place in the system organization chart is changed, the system may automatically change the rights for the manager. Such rights may define which information the manager has access to and what actions he can take, for example.

In an embodiment, the questionnaire may comprise a set of questions. The questions may have inter-relationship and answering in one question may define the following questions to be asked, and/or their order. The questions asked may depend on the profile of the respondent and a user profile indicating a classification of the respondent in the system database may be used for this purpose. Furthermore, questions asked may depend on the summary result of previous questions asked. The respondent may build a profile of oneself while answering, and the system defines questions needed to be answered from a type of person, a content format of the question and a question order, Thus, the answering interface design may be changed based on the user profile. Next, the system may check if the needed information already is available in the database. In block 304, the dynamic database allows the user to freely select, combine and compare the existing information from/with the user's own information database and the global dynamic information database.

In an embodiment, the dynamic assessment system continuously monitors results entered so far into the system. Results or responses available in the system but not matching with the set criteria are identified, and the respondents are informed of a need for additional new information. Automatic reminder system may be activated in the system based on the intensity of the answering process. Furthermore, automatic sending process for the results may be defined, based on preset answering percentage, for example. Such percentage may be different for different entities in the project.

If current information is not enough to solve the need, the user is guided through a process collecting new information in block 305 and processing the new information to the user's own dynamic database in block 306. Collecting of new information may comprise the responses to the questionnaires presented to the user.

The dynamic database may comprise different types of items. Any database item can be compared against any other database item, for example a job template, a questionnaire, a response or benchmark information. The database is updated automatically as new information is entered into the system. The database may also identify deviations or any other information from its data, and automatically remind the owner of the database of such deviations. The information of a person or a user is saved in one place, and the system automatically informs the user of possible missing information or soon-to-outdate information.

In an embodiment, the user may design the format of the assessment information in a way that it best supports the process for using it (to solve the need). The format design of block 307 can be done uniquely for each person involved. The user has the option to use own design formats, the global design library or create a new design format, which again may be given to the global community for use.

Once the information is selected and structured in block 308, the information may be delivered to each person involved in a format that is designed for them.

In block 309 the business need is solved and the information provided increases the understanding of the situation, the people involved are able to make better decisions and likelihood for the need to be solved increases.

The example method presented in the foregoing is an example only. In other embodiments, different functions in the method may occur in a mutually different order.

Figure 4:
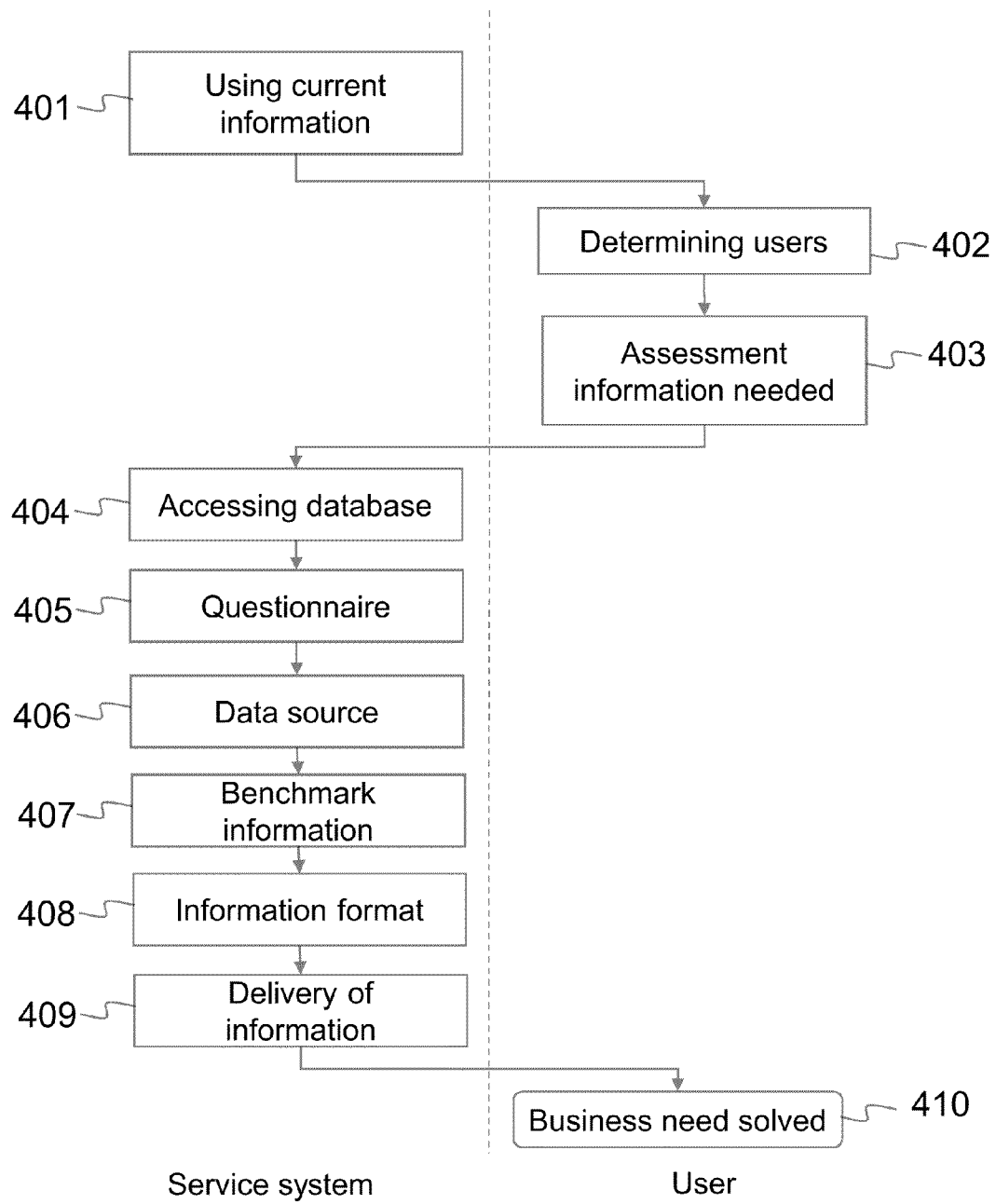
FIG. 4 shows a flow chart of exemplary steps for using current information according to an example embodiment of the present disclosure.

FIG. 4 shows a flow chart of exemplary steps for using current information according to an example embodiment of the present disclosure. Using of the current Information from the dynamic assessment database as in block 304 in FIG. 3 may be further described in more detail.

Using current information of block 401 is followed by determining the users who are to solve the need in block 402. After that the needed assessment information is defined in block 403.

The dynamic assessment database may then be accessed as in block 404. The database may be located in "cloud" storing all the information of the users. The cloud location allows combining and benchmarking information around the world, still preserving the privacy of information. The database comprises user database and global database. User database may be password protected storing all the data of the user. The user may also allow the personal data to be used by the global database. The global database combines the information dynamically in a format allowing every user to benchmark the information against different criteria.

In block 405, an assessment questionnaire is selected in the system based on the business need and information needed by the user. Data source 406 may be then automatically suggested to the user by the system, based on available data from user database and global database. The user may select the most appropriate data sources for this need from the system or let the system automatically select.

Furthermore, benchmark information of block 407 may be fetched next from the dynamic database. The assessment service system may automatically suggest the user benchmark data both from the user database and the global database. The user may select the most appropriate benchmarks for the need. The user is also allowed to create a temporary benchmark from any data available.

In an embodiment, the benchmark information is dynamic information that new users are added to when falling into the set filters in the benchmark. The assessment system may analyze the benchmark information and warn the user of any deviations in the data. Different benchmarks may be compared and even combined by the assessment system and more users invited, if needed.

Furthermore, dynamic job templates may exist in the dynamic assessment system. A job score may be automated and updated by connecting the job template in a group. As the group changes in the database, also the job score is re-calculated, The user may also select a format for the assessment information in block 408. The selection may be based on available information formats from the user database or the global database. The user is also allowed to create new information formats.

In block 409, the assessment information is delivered using the selected format to relevant users. The delivery may be determined by the user requesting the assessment and may include only the requesting user, all users relating to the assessment or a subset of the users. Eventually, the business need is solved in block 410.

Figure 5:
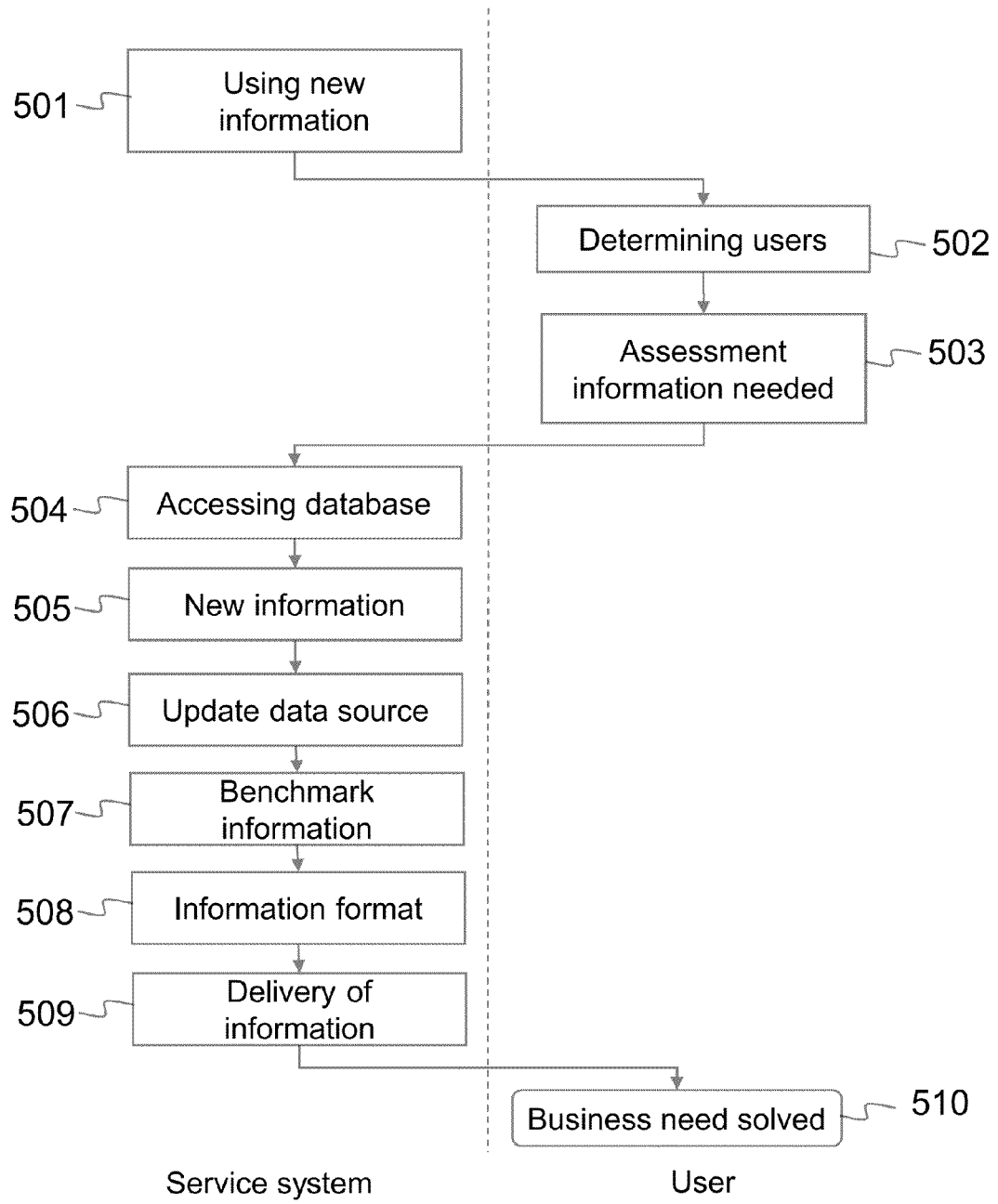
FIG. 5 shows a flow chart of exemplary steps for using new information according to an example embodiment of the present disclosure.

FIG. 5 shows a flow chart of exemplary steps for using new information according to an example embodiment of the present disclosure. Using of the new Information from the dynamic assessment database as in block 305 in FIG. 3 may be further described in more detail.

Using current information of block 501 is followed by determining the users who are to solve the need in block 502. After that the needed assessment information is defined in block 503.

The dynamic assessment database may then be accessed as in block 504. The database may be located in "cloud" storing all the information of the users. The cloud location allows combining and benchmarking information around the world, still preserving the privacy of information. The database comprises user database and global database. User database may be password protected storing all the data of the user. The user may also allow the personal data to be used by the global database. The global database combines the information dynamically in a format allowing every user to benchmark the information against different criteria.

In block 505, new information is set to be needed. An assessment questionnaire desired is not found in the service system and a new assessment questionnaire is created by the user. A data source may be then updated 506 to the system and made available from user database and global database. The user may select the updated data sources for the system or let the system automatically select. In block 506, the new assessment questionnaire may be stored to the system. Furthermore, responses to the new assessment questionnaire from the users determined to solve the need may be stored to the system.

Furthermore, benchmark information of block 507 may be fetched next from the dynamic database. The assessment service system may automatically suggest the user benchmark data both from the user database and the global database. The user may select the most appropriate benchmarks for the need. The user is also allowed to create a temporary benchmark from any data available.

The user may also select a format for the assessment information in block 508. The selection may be based on available information formats from the user database or the global database. The user is also allowed to create new information formats.

In block 509, the assessment information is delivered using the selected format to relevant users. The delivery may be determined by the user requesting the assessment and may include only the requesting user, all users relating to the assessment or a subset of the users. Eventually, the business need is solved in block 510.

Figure 6:
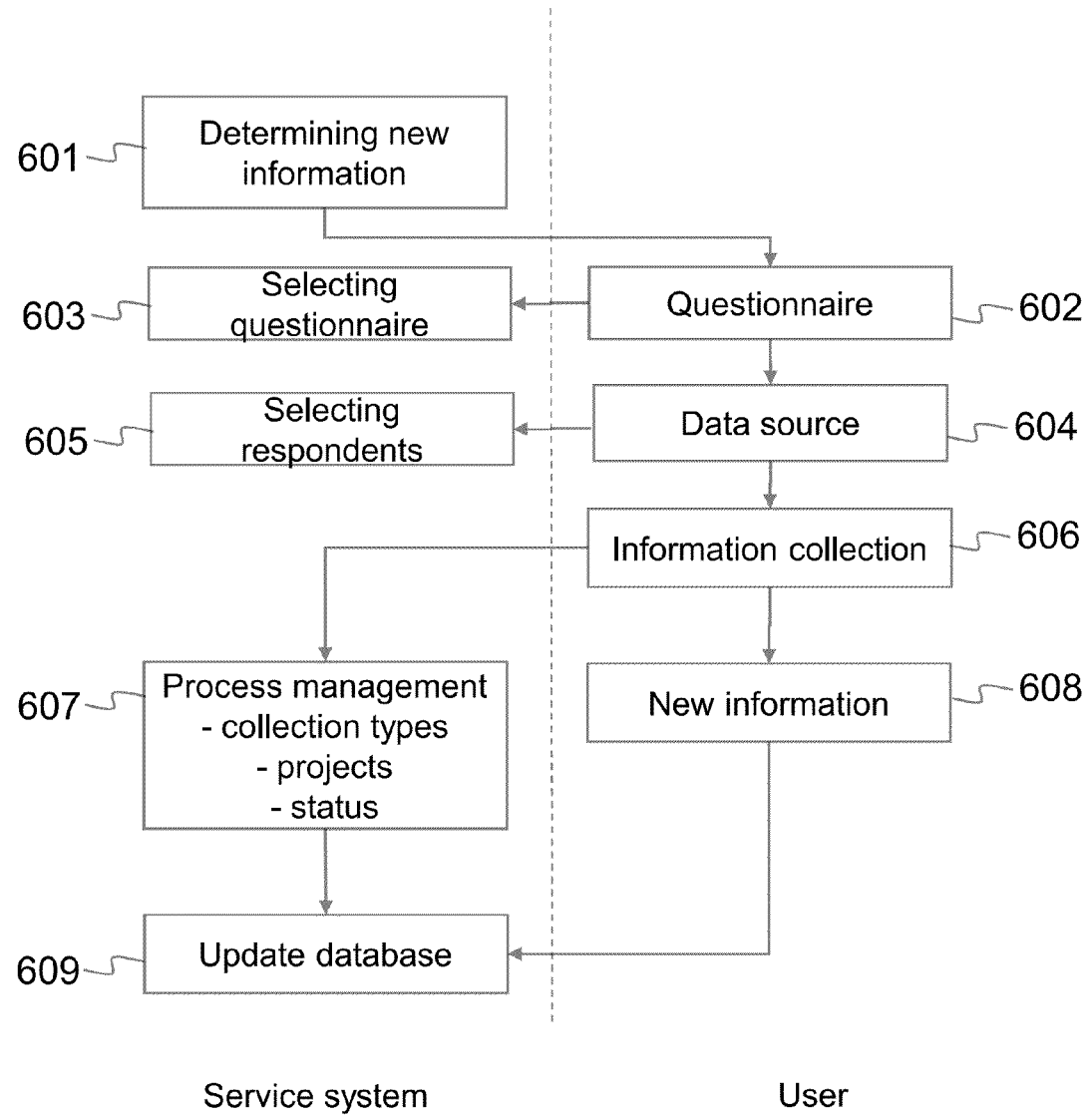
FIG. 6 shows a flow chart of exemplary steps for determining new information according to an example embodiment of the present disclosure.

FIG. 6 shows a flow chart of exemplary steps for determining new information according to an example embodiment of the present disclosure. Determining, collecting, storing and updating of the new Information to the dynamic assessment database as in block 505 in FIG. 5 may be further described in more detail.

In an embodiment, the user may select or determine the questionnaire in block 602. The selection of the questionnaire may be based on the business need and information needed. The system may help the user to select the right questionnaire in block 603.

The user may also define persons who can provide the information needed in block 604. The defined persons may be response users of the assessment service system and the response users may be divided in multi-level sub-groups. Such sub-groups may comprise, but are not limited to, a respondent, a manager, an assessment questionnaire administrator and a system administrator. Dynamic rules for the system may also be set to enable desired distribution of the information data. The system may also assist in selecting of the respondents in block 605, Information collection in block 606 may include defining conditions for the answering accounts, informing the answering respondents and monitoring the progress of the assessment. The information collection may also managed by the assessment service system in block 607. A project may be defined with closing based on time, volume of responses, or achieving the desired population distribution, for example.

In an embodiment, the assessment information is dynamically saved to the database in block 609, and is available for use by the user for any project. Dynamic updating of any benchmark may also be allowed. New assessment information determined by the user in block 608 may also be stored to the dynamic database in block 609.

Figure 7:
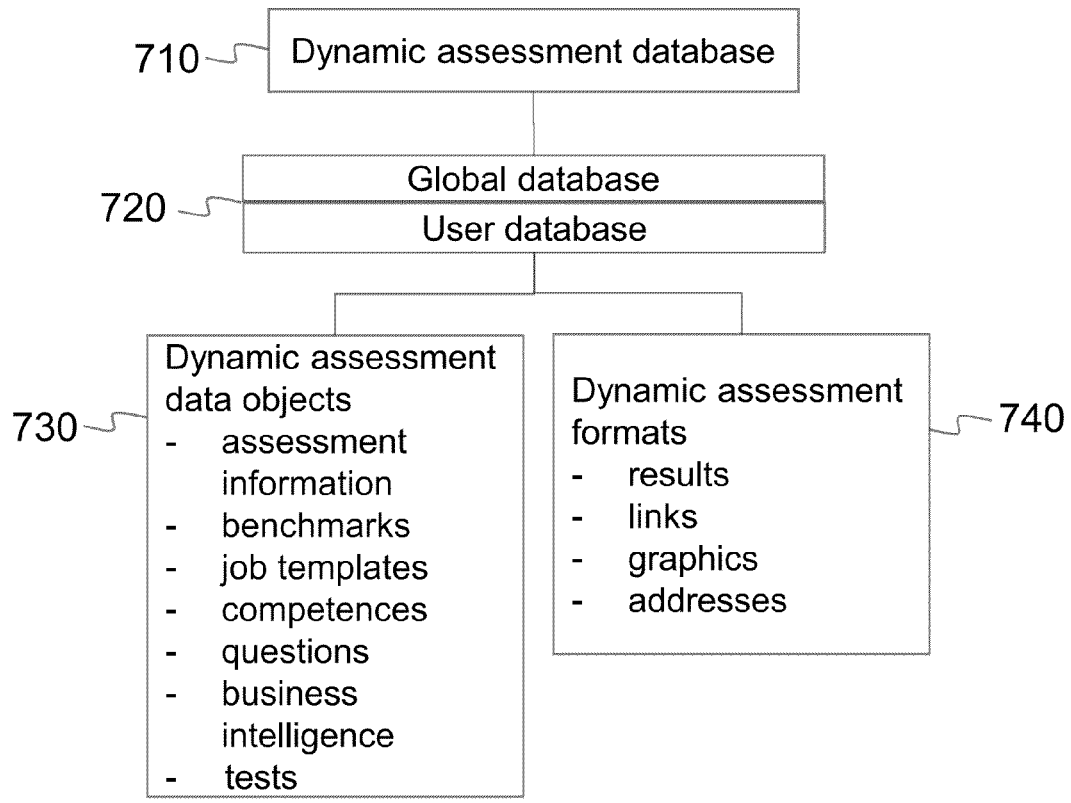
FIG. 7 shows a schematic diagram of assessment service system database structure according to an example embodiment of the present disclosure.

FIG. 7 shows a schematic diagram of assessment service system database structure according to an example embodiment of the present disclosure. A dynamic database 710 of the assessment service system may comprise a global database and user database entities 720. All the information stored to the dynamic assessment database 710 may be defined to be located in either or in both of the entities 720. The dynamic database 710 may further comprise sub-entities of dynamic assessment data objects 730 and dynamic assessment formats 740.

Different data objects in the system may have different dependencies and rights. A so-called mother data object may define the dependencies and rights for any child data object generated based on the mother data object. The dependencies and rights for the child data objects may be automatically updated based on the updates done for the mother data object in the system. For example, if a manager's access to a mother data object in the system is changed, the system may automatically change the rights for the manager to the dependent child data objects. Such rights may define which information the manager has access to and what actions he can take, for example.

In an embodiment, the dynamic assessment data objects 730 may comprise assessment information, benchmarks, job templates, competences, questionnaires and business intelligence, for example. The dynamic assessment formats 740 may comprise results, links, graphics and addresses, for example.

Figure 8:
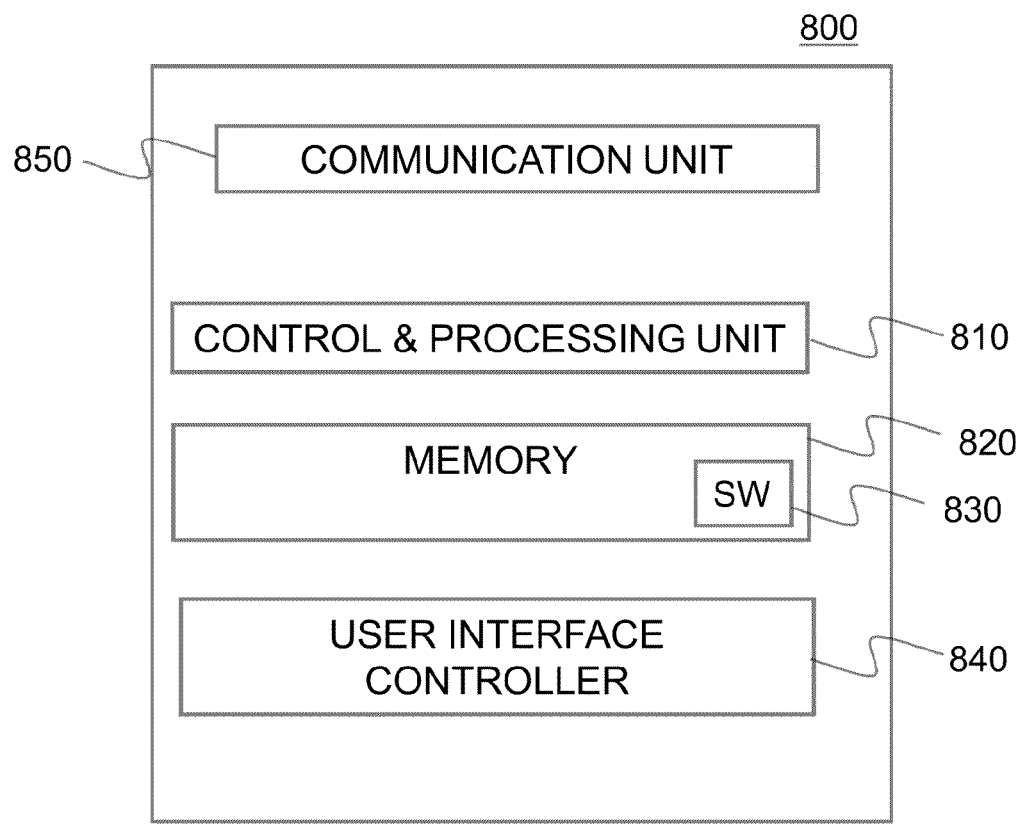
FIG. 8 shows an example block diagram of an apparatus in which various embodiments of the present disclosure may be applied.

FIG. 8 presents an example block diagram of an apparatus 800 in which various embodiments of the present disclosure may be applied. This may be a user device or apparatus, such as a laptop, a desktop, a mobile terminal or other communication device.

The general structure of the apparatus 800 comprises a communication interface module 850, a processor 810 coupled to the communication interface module 850, and a memory 820 coupled to the processor 810. The apparatus further comprises software 830 stored in the memory 820 and operable to be loaded into and executed in the processor 810. The software 830 may comprise one or more software modules and can be in the form of a computer program product.

The apparatus 800 further comprises a user interface controller 840 coupled to the processor 810.

The communication interface module 850 implements at least part of the user data radio discussed in connection with various embodiments of the present disclosure. The communication interface module 850 may be a wired broadband interface module such as LAN or WAN. The communication interface module 850 may also be, e.g., a radio interface module, such as a WLAN, Bluetooth, GSM/GPRS, CDMA, WCDMA, or LTE (Long Term Evolution) radio module. The communication interface module 850 may be integrated into the apparatus 800 or into an adapter, card or the like that may be inserted into a suitable slot or port of the apparatus 800. The communication interface module 850 may support one radio interface technology or a plurality of technologies. FIG. 8 shows one communication interface module 850, but the apparatus 800 may comprise a plurality of communication interface modules 850.

The processor 810 may be, e.g., a central processing unit (CPU), a microprocessor, a digital signal processor (DSP), a graphics processing unit, or the like. FIG. 8 shows one processor 810, but the apparatus 800 may comprise a plurality of processors.

The memory 820 may be for example a non-volatile or a volatile memory, such as a read-only memory (ROM), a programmable read-only memory (PROM), erasable programmable read-only memory (EPROM), a random-access memory (RAM), a flash memory, a data disk, an optical storage, a magnetic storage, a smart card, or the like. The apparatus 800 may comprise a plurality of memories. The memory 820 may be constructed as a part of the apparatus 800 or it may be inserted into a slot, port, or the like of the apparatus 800 by a user. The memory 820 may serve the sole purpose of storing data, or it may be constructed as a part of an apparatus serving other purposes, such as processing data.

The user interface controller 840 may comprise circuitry for receiving input from a user of the apparatus 800, e.g., via a keyboard, graphical user interface shown on the display of the apparatus 800, speech recognition circuitry, or an accessory device, such as a headset, and for providing output to the user via, e.g., a graphical user interface or a loudspeaker.

A skilled person appreciates that in addition to the elements shown in FIG. 8, the apparatus 800 may comprise other elements, such as microphones, displays, as well as additional circuitry such as input/output (I/O) circuitry, memory chips, application-specific integrated circuits (ASIC), processing circuitry for specific purposes such as source coding/decoding circuitry, channel coding/decoding circuitry, ciphering/deciphering circuitry, and the like. Additionally, the apparatus 800 may comprise a disposable or rechargeable battery (not shown) for powering the apparatus 800 when external power if external power supply is not available.

Figure 9:
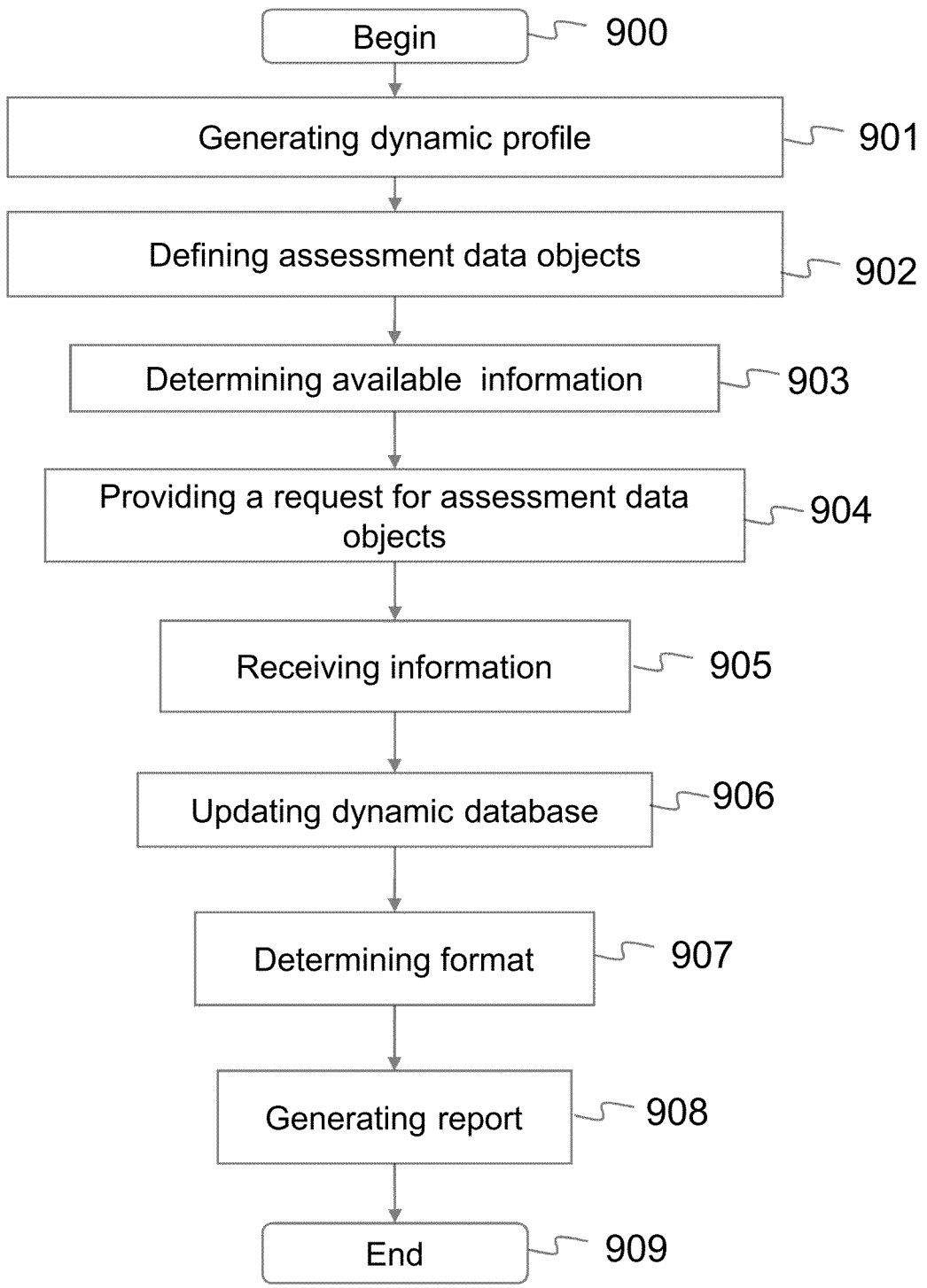
FIG. 9 shows a flow chart of exemplary method steps for providing dynamic assessment information according to an example embodiment of the present disclosure.

FIG. 9 shows another flow chart of exemplary method steps for providing dynamic assessment information according to an example embodiment of the present disclosure. The method steps may be performed in parallel and the operations may occur in other order. In addition, more steps or fewer steps may be carried out. The method begins at step 900. In step 901, dynamic profile information for a user is generated. In step 902, needed assessment data objects, associated with at least one user, are defined. Available information relating to assessment data objects are determined from a dynamic database in step 903 and a request for unavailable assessment data objects are provided to at least one user in step 904.

In step 905, the unavailable information to the assessment data objects are received from the at least one user. The dynamic database information is updated based on the received unavailable information in step 906. In step 907, an assessment report format for at least one user is determined. The assessment report is generated using the assessment data objects from the dynamic database in step 908. In step 909, the method ends.

FIG. 10 shows a schematic diagram of user profile information according to an example embodiment of the present disclosure. The user profile information is stored in the system of FIG. 2 as described earlier in the description.

The profile information 1000 may comprise user identification 1010, a password 1020, owner information 1030, and a number of user access rights information 1040, 1050. The user identification 1010 is the login name used to access the system and may comprise a dedicated user name, an e-mail account information or anonymous information, for example. The password 1020 comprises the password for accessing the system and the owner information 1030 defines the owner creating the user account to the system and owning the administration rights to the user information. In an embodiment, the owner may also be someone else than the creator of the user account, a kind of a silent owner.

The user access right information 1040, 1050 may comprise different sets of access rights for user information and user item information. RightsU column 1040 defines privileges for each user to have access to other users' assessment data objects in the dynamic system database. User A may in the showed embodiment have access to user A and C assessment data objects, whereas user B may have access to user B and C assessment data objects, respectively. User C may have access to user A, B and C assessment data objects.

RightsO column 1050 defines privileges for each user to have access to dedicated assessment data objects in the dynamic database. User B may in the showed embodiment have access to assessment data objects Y and Z, whereas user A may have access to assessment data objects W and Z, respectively. User C may have access to assessment data objects W and Y.

In an embodiment, the access rights to dedicated assessment data objects may comprise different levels. "Use" may correspond to a use right of the data object, "Edit" may correspond to an edit right of the data object and "Clone" may correspond to a right to clone the data object for own ownership. Every "x" in FIG. 10 may thus be replaced by at least one of the indications "Use", "Edit" and "Clone".

Figure 11:
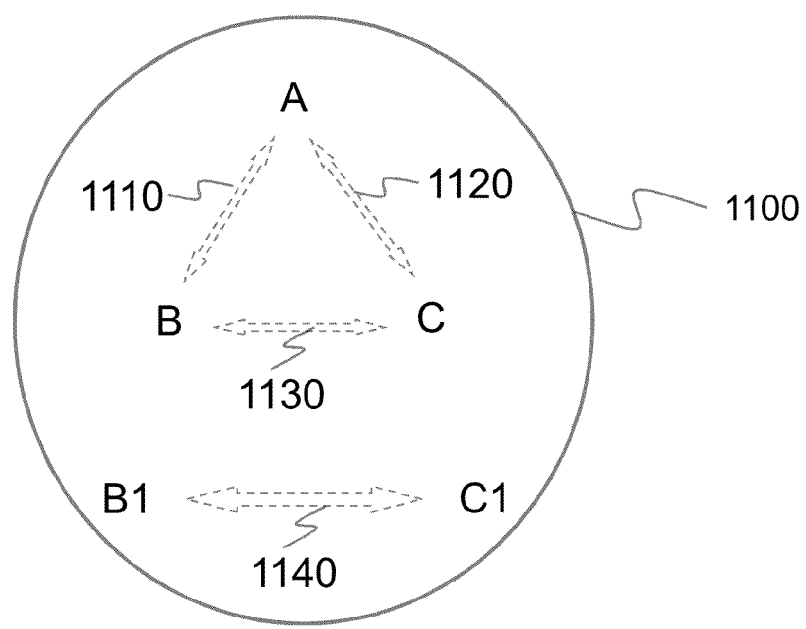
FIG. 11 shows a schematic diagram of providing access rights between users according to an example embodiment of the present disclosure.

FIG. 11 shows a schematic diagram of providing access rights between users according to an example embodiment of the present disclosure. A subset 1100 of the users having access to the dynamic assessment system is described. In the dynamic assessment data system the access rights between the users need not to be performed in tree-like fashion. In an embodiment, the user A may give access rights to all assessment data objects or only to selected assessment data objects, as illustrated by arrow 1110. The user B may give access rights to user A, respectively. Arrow 1120 illustrates user rights definitions for assessment data objects between users A and C and arrow 1130 illustrates user rights definitions for assessment data objects between users B and C. Furthermore, user B1 may give access rights to user C1 to a set of assessment data objects, as illustrated by arrow 1140 without giving same rights to users A, B or C, for example. Thus, any user may allow access dynamically to any other user for a defined set of assessment data objects in the dynamic assessment system. No access rights coordination via a traditional high level system administrator is needed. In an embodiment, the positions of the users in the organization structure may be changed dynamically.

Figure 12:
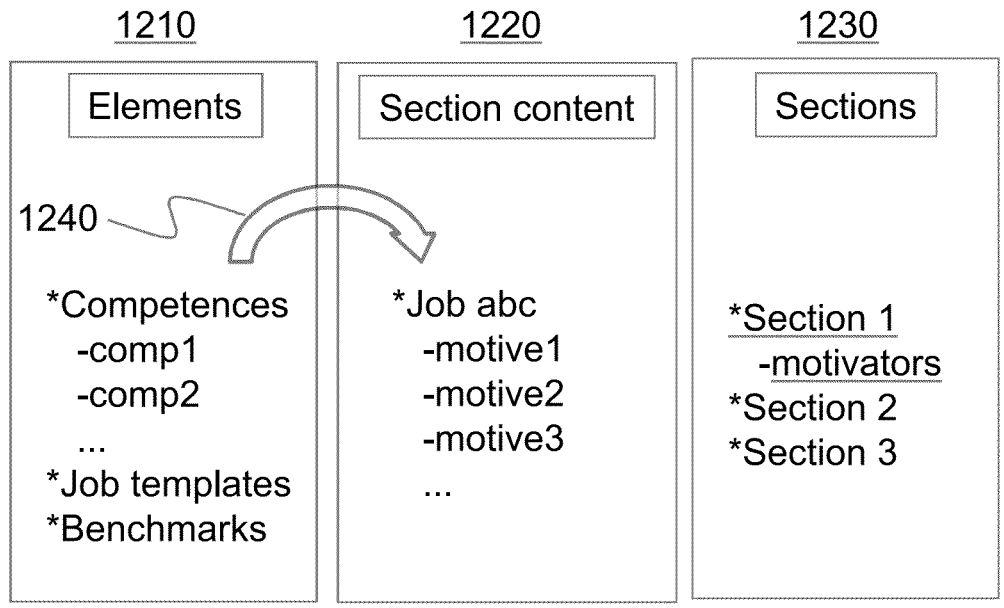
FIG. 12 shows a schematic diagram of a report formation view according to an example embodiment of the present disclosure.

FIG. 12 shows a schematic diagram of a report formation view according to an example embodiment of the present disclosure. Frame 1220 shows content of a section in a report. Frame 1210 shows report elements the user has available to include in the report format. The elements may be dynamic in nature when the actual content (when the assessment report is produced) depends on the current state of assessment data in the dynamic database, or it can be static with the user predefining the content of the data. Frame 1230 shows the sections already created for the report format. The user may add new section, edit and delete existing ones at any time. Arrow 1240 shows the drag-and-drop method the user may use to place report elements in certain section. The elements may be placed to any section, at any order, and as many times as desired. Also other methods but drag-and-drop may be used for selecting and positioning the report elements.

In an embodiment, the system may allow the user to pilot the report format with dummy data. Furthermore, the report format can be defined for any particular language or set of languages.

Figure 13:
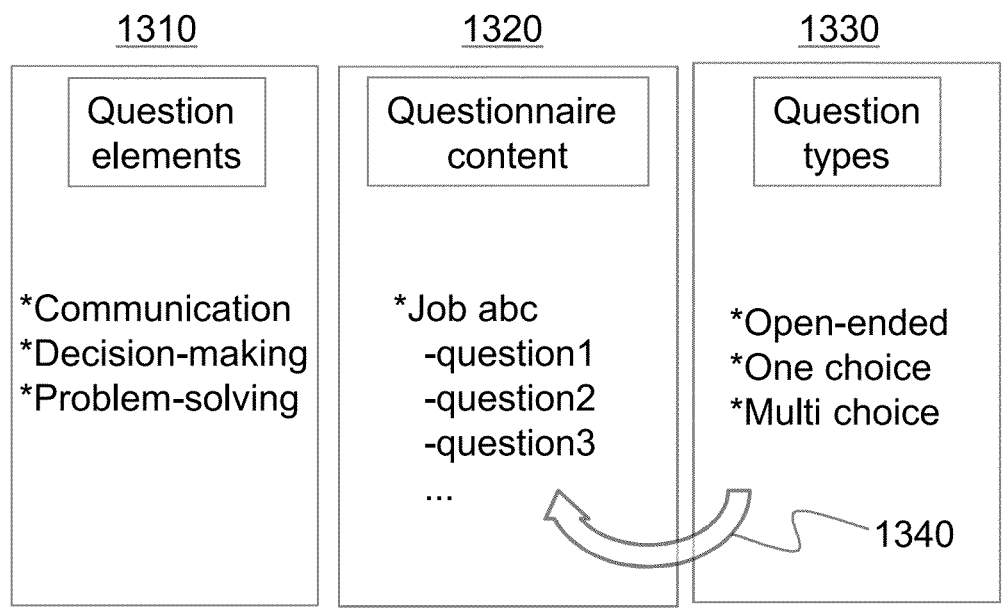
FIG. 13 shows a schematic diagram of a questionnaire formation view according to an example embodiment of the present disclosure.

FIG. 13 shows a schematic diagram of a questionnaire formation view according to an example embodiment of the present disclosure. Frame 1320 shows content of a section in a questionnaire. Frame 1310 shows question groups created by the user. The groups combine questions that belong to the same heading but also define dependencies between the groups and questions within a group. Frame 1330 shows question types available for the user. Each question type may contain dependencies that define how, when and where the question can be used. Arrow 1340 shows the drag-and-drop method for selecting a question type, connecting it with a group and defining content and rules for the question.

Various embodiments have been presented. It should be appreciated that in this document, words comprise, include and contain are each used as open-ended expressions with no intended exclusivity.

The foregoing description has provided by way of non-limiting examples of particular implementations and embodiments a full and informative description of the best mode presently contemplated by the inventors for carrying out the present disclosure. It is however clear to a person skilled in the art that the invention is not restricted to details of the embodiments presented above, but that it can be implemented in other embodiments using equivalent means or in different combinations of embodiments without deviating from the characteristics of the invention.

Furthermore, some of the features of the above-disclosed embodiments of this present disclosure may be used to advantage without the corresponding use of other features. As such, the foregoing description shall be considered as merely illustrative of the principles of the present disclosure, and not in limitation thereof. Hence, the scope of the invention is only restricted by the appended patent claims.

The invention claimed is:

1. A method comprising:
storing a plurality of users, assigned with at least one nonhierarchical dependency, for defining a dynamic organization structure;
storing assessment data objects to an assessment service system, each object having dependencies, for defining a dynamic assessment data object structure;
determining an assessment need in the dynamic organization structure;
defining a dynamic assessment account, in response to the assessment need, associating an administrator user, a response user and assessment data;
defining needed assessment data objects for the assessment data, associated with at least one response user;
determining available information relating to the needed assessment data objects from a dynamic database;
providing a request relating to the needed assessment data objects to at least one response user;
receiving a response relating to the request for the needed assessment data objects, from the at least one response user; and
updating assessment data objects of the dynamic assessment data object structure based on the received response and the dependencies.

2. A method comprising:
providing a plurality of users, assigned with at least one nonhierarchical dependency, for defining a dynamic organization structure;
providing assessment data objects, each having dependencies, for defining a dynamic assessment data object structure;
determining an assessment need in the dynamic organization structure;
defining assessment data objects relating to the assessment need for the assessment data, associated with at least one response user;
determining formats of an assessment report for assessment data objects, each having dependencies;
displaying at least one format and at least one assessment data object for at least one user via a user interface controller of an apparatus;
selecting at least one format and at least one assessment data object; and
generating the assessment report, by an assessment service system, using the assessment data objects of a dynamic database.

3. The method of claim 1, further comprising storing profile information for at least one user, wherein the profile information comprises at least one of the following:
user identification;
a password;
an owner;
access right to user; and
access right to assessment data object.

4. The method of claim 1, further comprising:
selecting additional assessment information from the dynamic database; and
using the additional assessment information in generating the assessment report.

5. The method of claim 4, wherein the additional assessment information comprises at least one of the following: benchmark information, user profile information, design information, contact information and time information.

6. The method of claim 1, wherein the dynamic database comprises a global database and a personal database.

7. The method of claim 6, wherein the global database is accessible to registered users of the dynamic database.

8. The method of claim 6, wherein the personal database is accessible to users having access rights based on the nonhierarchical dependencies.

9. The method of claim 1, further comprising:
maintaining an association between a user identification and a user password;
receiving the user identification and the user password from the user when the user is accessing the dynamic database; and
allowing access to the dynamic database based on the received user identification and the user password.

10. The method of claim 1, further comprising selecting at least one assessment data object from the dynamic database.

11. The method of claim 1, further comprising creating at least one new assessment data object to the dynamic database.

12. The method of claim 1, wherein the assessment data object comprises at least one of the following:
an assessment questionnaire;
a response to an assessment questionnaire;
a benchmark;
a competence;
a test;
a job template; and
a job template score.

13. The method of claim 2, wherein the format comprises at least one of the following:
a design for collecting assessment data; and
a design for reporting assessment data.

14. The method of claim 2 wherein the determination of the assessment report format comprises selecting at least one assessment report format from the dynamic database.

15. The method of claim 2, wherein the determination of the assessment report format comprises creating at least one assessment report format to the dynamic database.

16. The method of claim 1, further comprising defining access rights to the assessment data objects of the dynamic database for the user.

17. The method of claim 13, the access rights to the dynamic database comprise at least one of the following: a system administrator, a user administrator, a result user and a response user.

18. The method of claim 8, wherein a first assessment data object and a second assessment data object are selected from the dynamic database, and the second assessment data object is selected based on the selection of the first assessment data object.

19. The method of claim 8, wherein the assessment data object is selected from the dynamic database based on the dynamic profile information of the associated user.

20. The method of claim 1, further comprising determining the assessment report format based on the dynamic profile information of the associated user.

21. A device comprising:
a communication unit configured to provide access to a dynamic database;
a processor;
a memory including computer program code;
the memory and the computer program code configured to, with the processor, cause the device to:
provide assessment data objects, associated with at least one user;
receive available information relating to assessment data objects from a dynamic database;
transmit a request for unavailable assessment data objects for at least one response user;
receive the unavailable information to the assessment data objects from the at least response user;
transmit updated dynamic database information based on the received unavailable information; and
determine an assessment report format for at least one user.

22. An apparatus comprising:
a communication unit configured to provide access to a device;
a processor;
a memory including computer program code;
the memory and the computer program code configured to, with the processor, cause the apparatus to:
generate dynamic profile information for a user;
generate assessment data objects, associated with at least one user
determine available information relating to assessment data objects from a dynamic database;
provide a request for unavailable assessment data objects to at least one response user;
receive the unavailable information to the assessment data objects from the at least one response user;
update the dynamic database based on the received unavailable information;
determine an assessment report format for at least one user; and
generate the assessment report using the assessment data objects from the dynamic database.

23. A computer program embodied on a computer readable non-transitory medium comprising computer executable program code which, when executed by at least one processor of an apparatus, causes the apparatus to perform the steps of claim 1.

24. The method of claim 1, further comprising storing profile information for at least one user, wherein the profile information comprises access rights to an assessment data object.

* * * * *